US008900763B2

(12) United States Patent
Lundblad et al.

(10) Patent No.: US 8,900,763 B2
(45) Date of Patent: Dec. 2, 2014

(54) ELECTROCHEMICALLY ACTUATED VALVE

(75) Inventors: Anders Lundblad, Stockholm (SE); Mahsa Mashoof, Solna (SE); Daniel Karlsson, Knivsta (SE); Magnus Lindblom, Arsta (SE); Raphael Poulain, Odos (FR)

(73) Assignee: myFC AB, Stockholm (SE)

( * ) Notice: Subject to any disclaimer, the term of this patent is extended or adjusted under 35 U.S.C. 154(b) by 13 days.

(21) Appl. No.: 13/805,012

(22) PCT Filed: Jun. 17, 2011

(86) PCT No.: PCT/SE2011/050767
§ 371 (c)(1),
(2), (4) Date: Dec. 18, 2012

(87) PCT Pub. No.: WO2011/159246
PCT Pub. Date: Dec. 22, 2011

(65) Prior Publication Data
US 2013/0095400 A1    Apr. 18, 2013

(30) Foreign Application Priority Data

Jun. 18, 2010  (SE) ..................................... 1050628

(51) Int. Cl.
*H01M 8/06*       (2006.01)
*F16K 31/00*      (2006.01)
*F16K 99/00*      (2006.01)
*H01M 8/04*       (2006.01)

(52) U.S. Cl.
CPC ............. *F16K 31/00* (2013.01); *F16K 99/0005* (2013.01); *F16K 99/0042* (2013.01); *F16K 99/0061* (2013.01); *H01M 8/04082* (2013.01); *H01M 8/0606* (2013.01); *Y02E 60/50* (2013.01); *Y02E 60/366* (2013.01)
USPC ..................................... 429/422; 251/129.03

(58) Field of Classification Search
CPC .............................. H01M 8/0606; F16K 31/00
USPC ....................................... 429/422; 251/129.03
See application file for complete search history.

(56) References Cited

U.S. PATENT DOCUMENTS 5,038,821 A    8/1991   Maget, Jr.
5,671,905 A    9/1997   Hopkins
(Continued)

FOREIGN PATENT DOCUMENTS

EP    1065378        1/2001
WO    02/084768      10/2002
WO    2005/088759     9/2005
(Continued)

OTHER PUBLICATIONS

International Search Report dated Sep. 29, 2011, corresponding to PCT/SE2011/050767.

*Primary Examiner* — Nicholas P D'Aniello
(74) *Attorney, Agent, or Firm* — Young & Thompson

(57) ABSTRACT

An electrochemically operable actuator (20), includes a support structure, a flexible membrane sealed against the support structure to form a compartment (108), electrochemical element (101) adapted to generate hydrogen or oxygen gas and to deliver the gas to the inside of the compartment, the electrochemical element including an ion conducting membrane having an electrode on opposing sides thereof, and terminal element for connecting a voltage source to enable applying a potential across the electrodes. The electrochemical element can be a hydrogen pump (101) or an electrolyzer or both. A fuel cell assembly (100) incorporating a valve (V) with an actuator is also described.

19 Claims, 13 Drawing Sheets

(56) References Cited

U.S. PATENT DOCUMENTS

| | | |
|---|---|---|
| 8,398,693 B2 * | 3/2013 | Weber et al. ............ 623/1.11 |
| 2005/0103706 A1 | 5/2005 | Bennett et al. |
| 2008/0096075 A1 * | 4/2008 | Lundblad et al. ............ 429/30 |
| 2010/0035110 A1 * | 2/2010 | Lundblad ............ 429/30 |

FOREIGN PATENT DOCUMENTS

| | | |
|---|---|---|
| WO | 2006/041397 | 4/2006 |
| WO | 2007/117212 | 10/2007 |
| WO | 2009/025613 | 2/2009 |
| WO | 2009/025614 | 2/2009 |

* cited by examiner

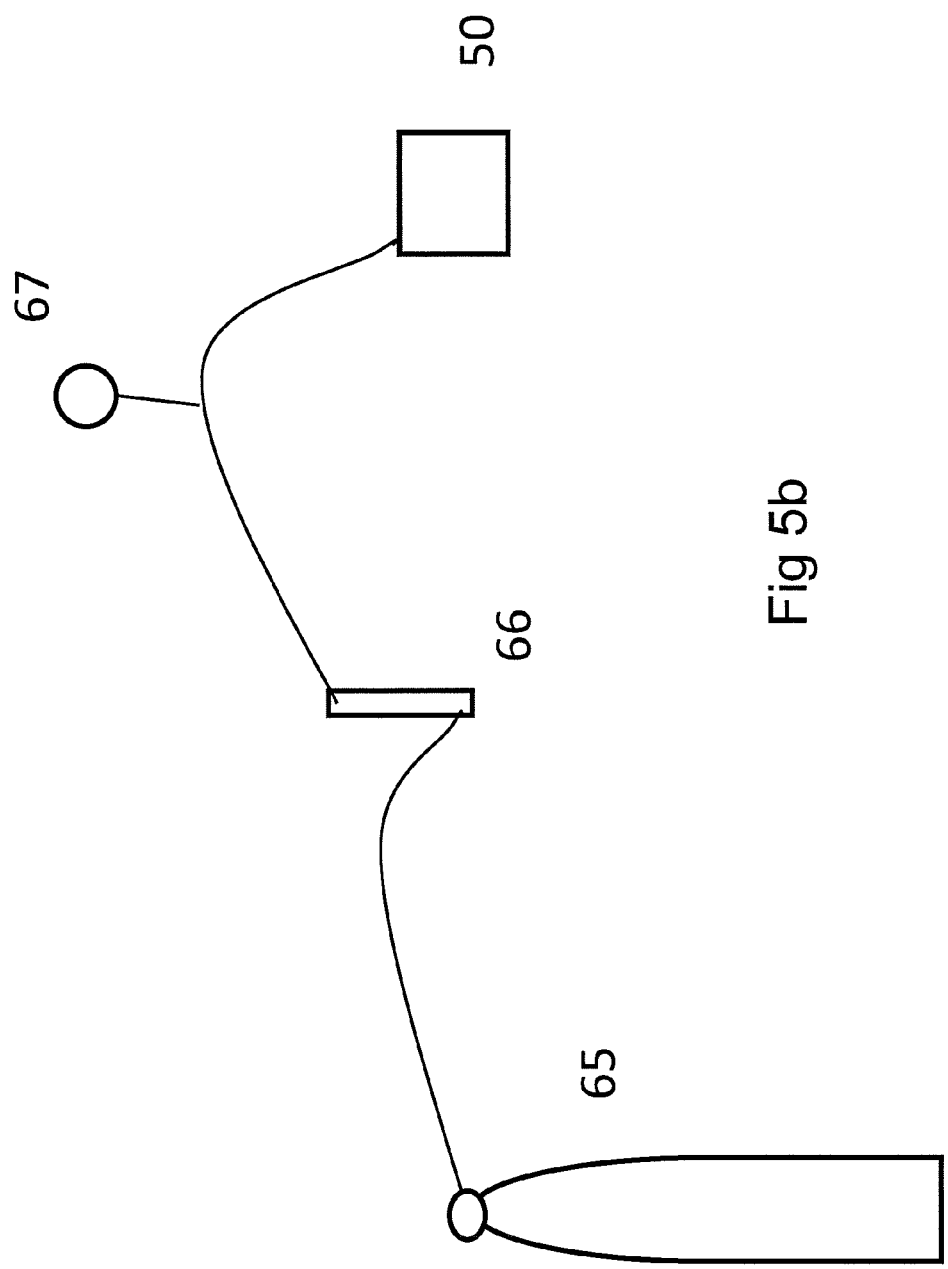

ELECTROCHEMICALLY ACTUATED VALVE

The present invention relates to micro actuators and valves, and in particular to electrochemical actuators and valves comprising such actuators.

BACKGROUND OF THE INVENTION

In many technical applications there is a need for very small valves for gases and/or liquids. Mechanical and/or electromechanical valves are often difficult to miniaturize, and expensive to produce.

As an alternative to mechanical and/or electromechanical valves there are known in the prior art actuators and valves using electrochemical means for the actuation.

One example of an electrochemical actuator is disclosed in U.S. Pat. No. 5,671,905. It comprises an electrolyte solution sealed within a substantially constant volume chamber, having electrical contacts disposed therein such that the electrolyte is in electrical connection with the electrical contacts. Passage of current between the contacts through the electrolyte, separates the electrolyte and or electrode material into its component gas or gases, resulting in an increased pressure within the chamber. This pressure can either act directly upon, or be routed via pneumatic or hydraulic lines, to actuate a diaphragm, move a piston, inflate a bladder, or any other suitable means of converting pressure to motion or displacement.

Another example is disclosed in U.S. Pat. No. 5,038,821. It is an electrochemically actuated control valve which is actuated by an electrochemical prime mover that converts DC electrical energy into compressed gas energy that is then used to produce mechanical work. The mechanical motion of the electrochemical actuator is typically linear motion.

The above mentioned devices are manufactured as separate units requiring separate mounting or integration in the system in which they are to be used. They also comprise a plurality of components that has to be assembled, rendering the manufacture fairly complex and thus costly.

The published patent applications WO 2007/117212, WO 2009/025613 and WO 2009/025614 describe fuel cell technology according to the state of the art.

SUMMARY OF THE INVENTION

It would be desirable to be able to manufacture actuators and/or entire valves of the above discussed type in a continuous production line, i.e. without the need to assemble discrete components.

For many applications it would also be desirable to enable the integration of the actuator and/or valve in a device or system already during manufacturing, i.e. the valves should be produced in the same manufacturing operation as the entire device or system in which they are integrated, preferably in a continuous production line.

The primary object of the present invention is therefore to simplify production of actuators and/or valves, and make production more cost effective.

The actuator can be made by using only foil components and adhesives. This enables cost efficient mass production by using techniques such as rotary die cutting.

For this purpose the inventors have devised a new type of actuator and a valve employing such an actuator.

The actuator according to the invention is defined in claim 1.

In a second aspect of the invention a valve comprising an actuator according to the invention is provided. The valve is defined in claim 22.

There is also provided a fuel cell assembly, wherein the fuel cells are in-plane polymer electrolyte fuel cells, and wherein the valve mechanism is embedded in at least one of the layers making up the assembly. This assembly is defined in claim 30.

Further scope of applicability of the present invention will become apparent from the detailed description given hereinafter and the accompanying drawings which are given by way of illustration only, and thus not to be considered limiting on the present invention, and wherein FIG. 1a shows schematically an actuator according to the invention in a non-actuated state;

Figure 3:
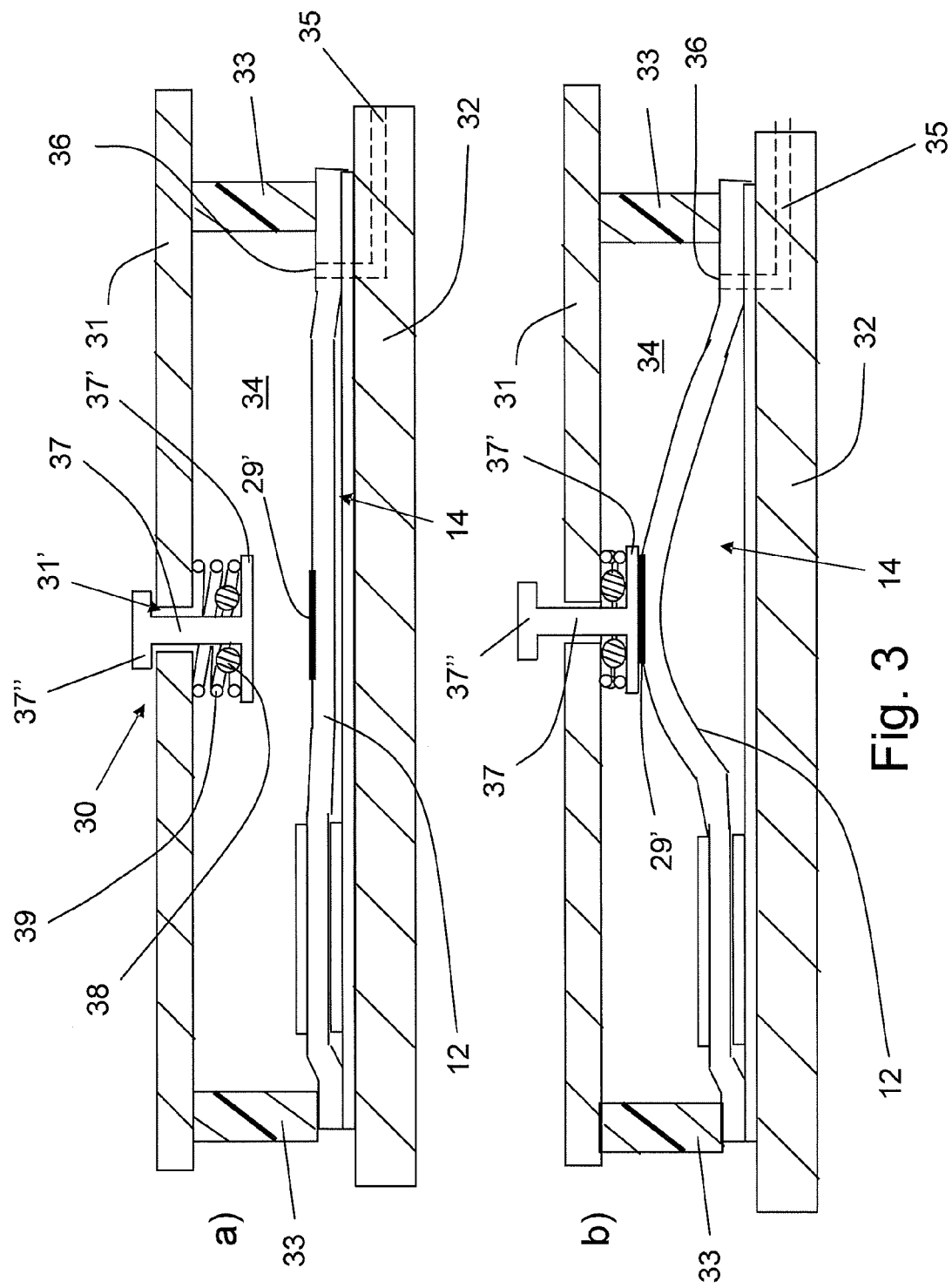
Figure 5A:
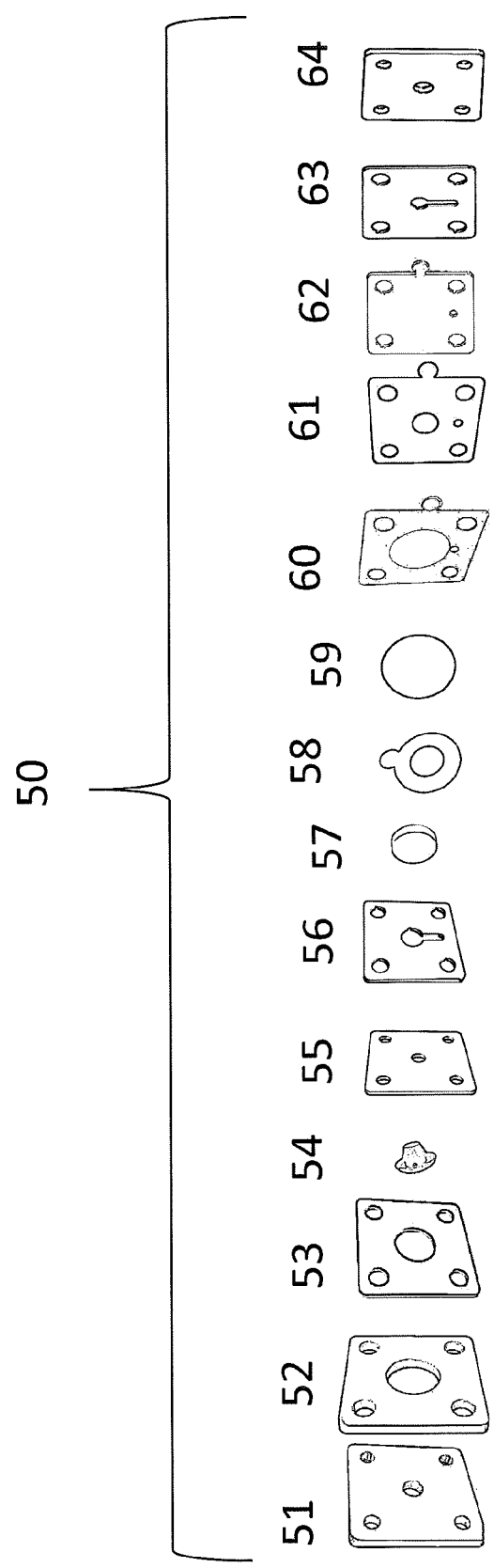

FIG. 3a schematically illustrates a further embodiment in open state;

FIG. 3b schematically illustrates the embodiment of FIG. 3a in closed state;

FIG. 4a shows an embodiment which is configured in a reversed manner compared to in FIG. 3, in closed state;

FIG. 4b schematically illustrates the embodiment of FIG. 4a in open state;

FIG. 5a is an exploded view of a test set-up;

FIG. 5b is an overview of a test set-up; and

Figure 6:
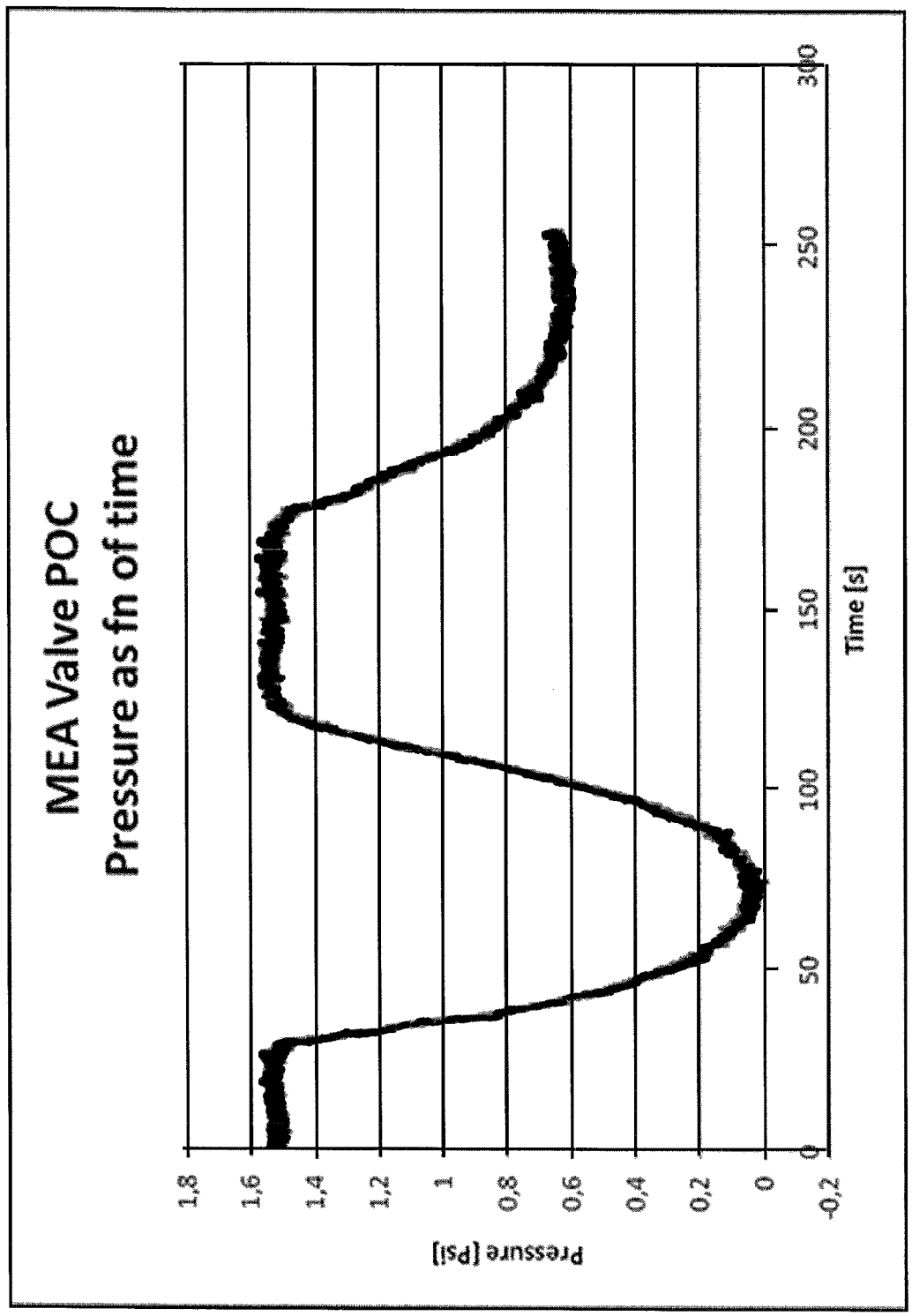

FIG. 6 is a pressure vs time curve for a test procedure.

Figure 7:
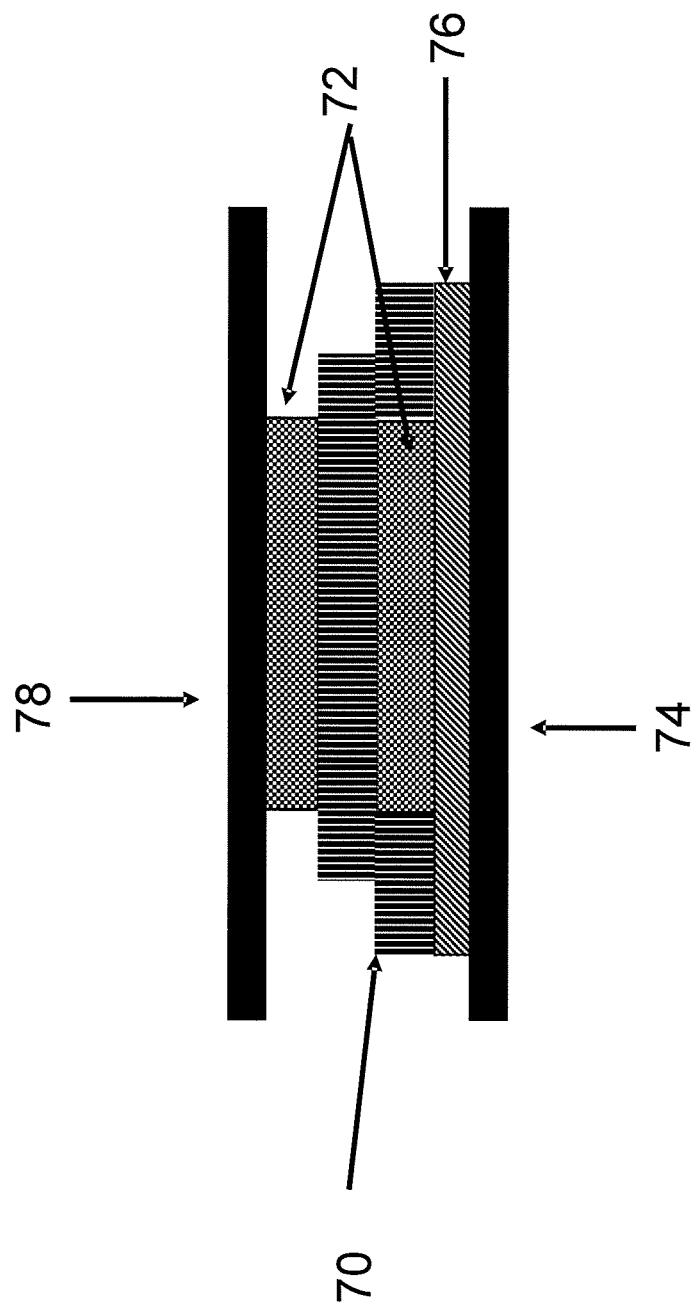
Figure 8A:
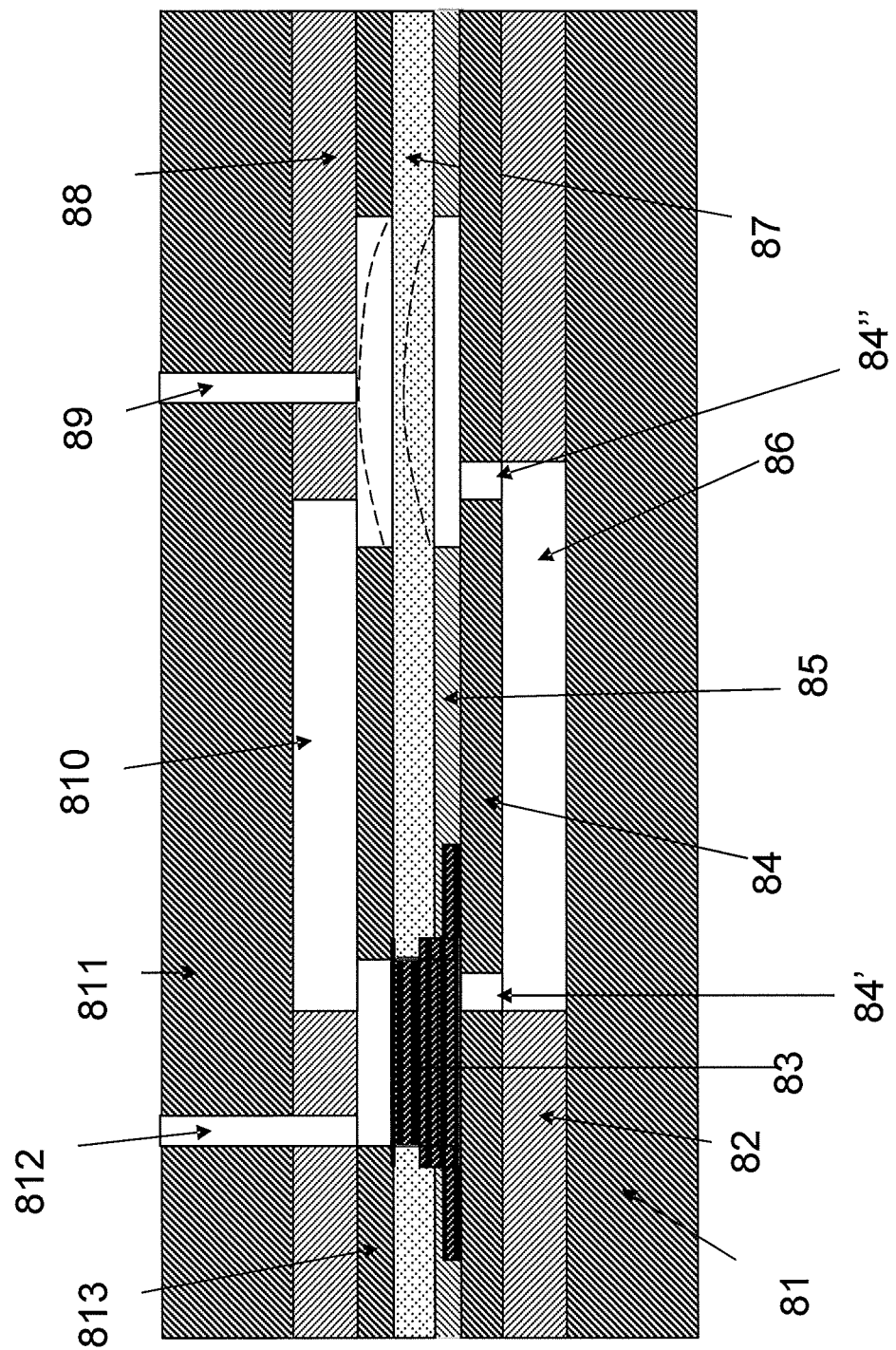
Figure 8B:
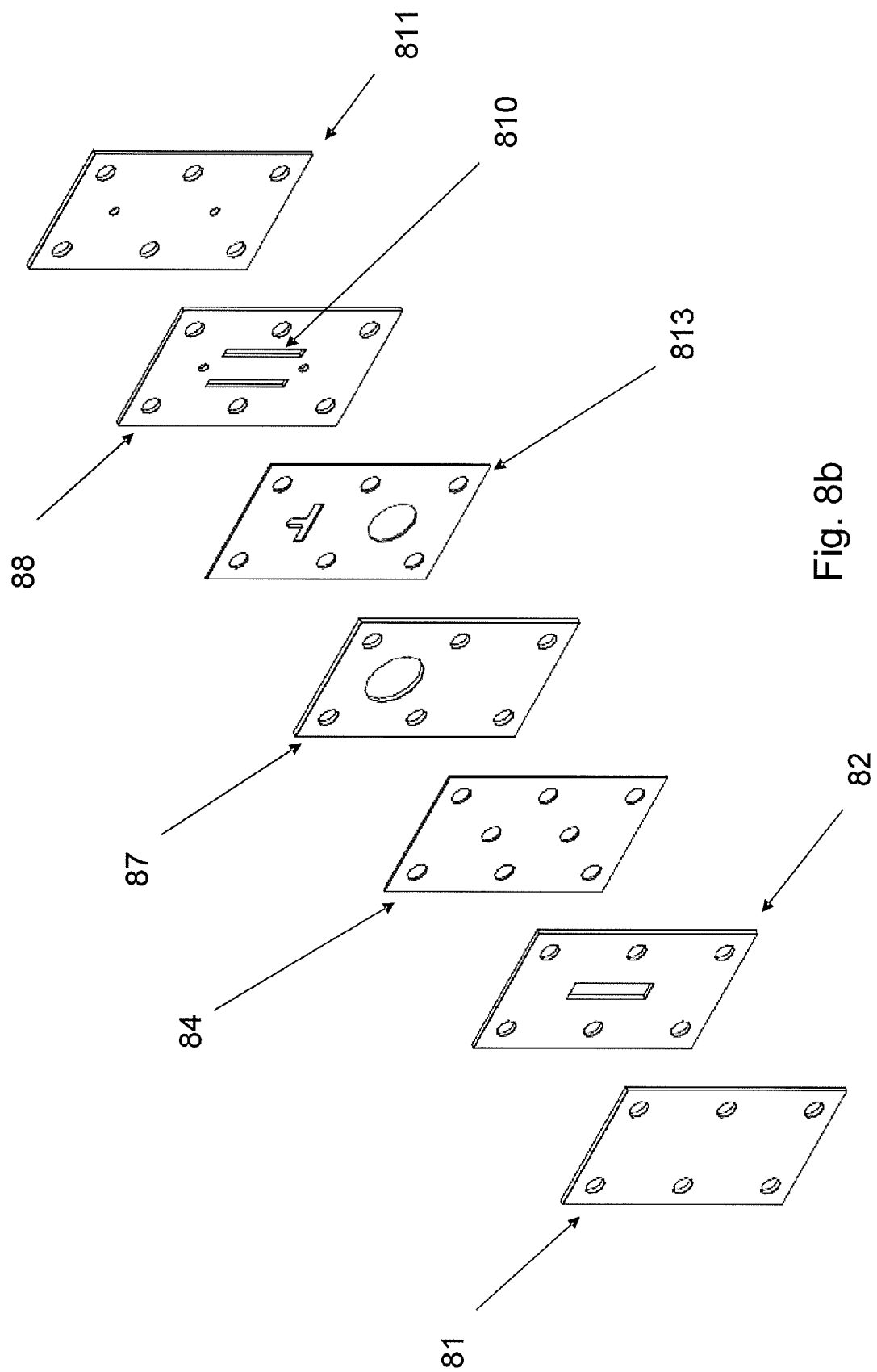
Figure 9:
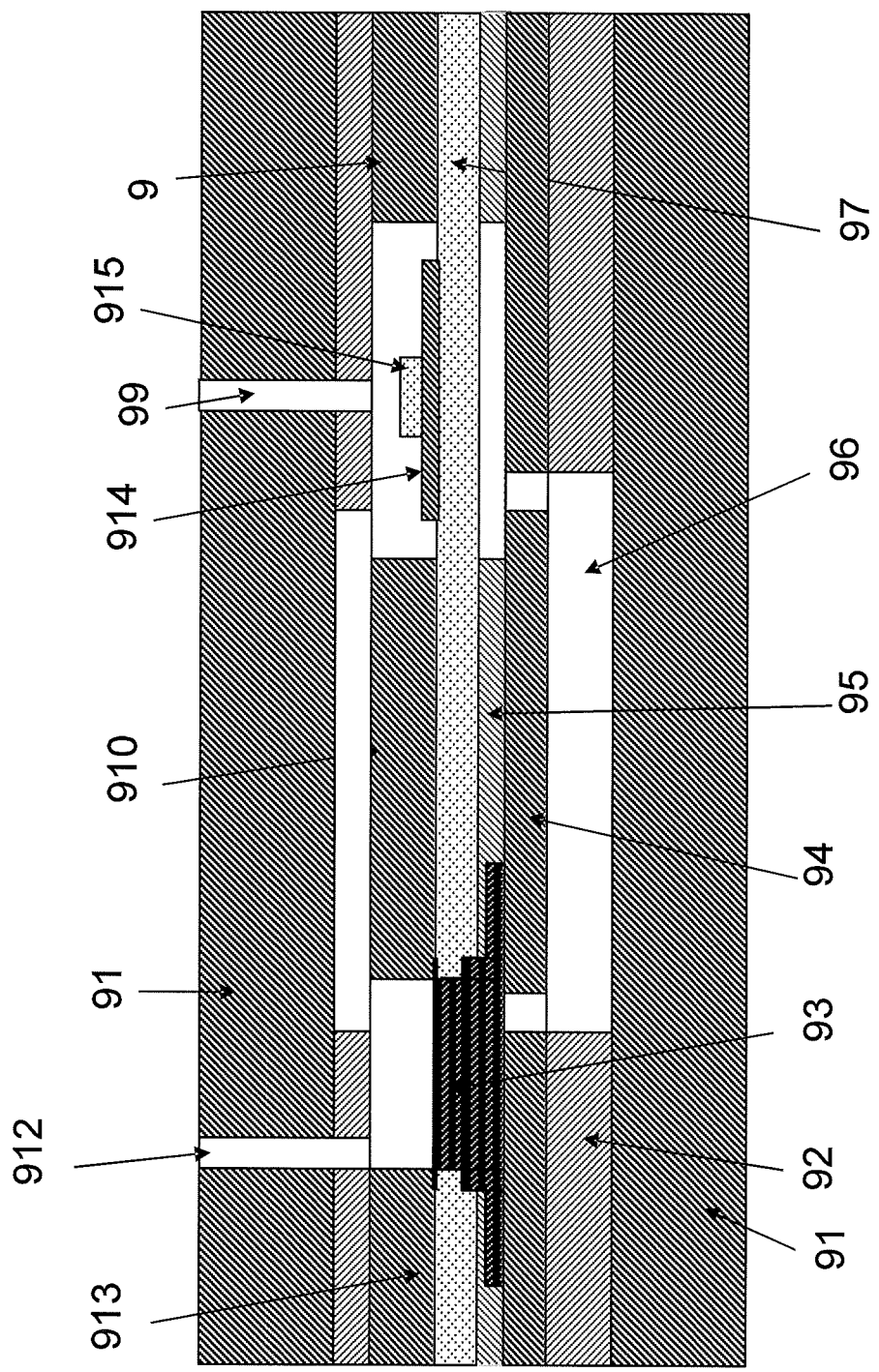
Figure 10:
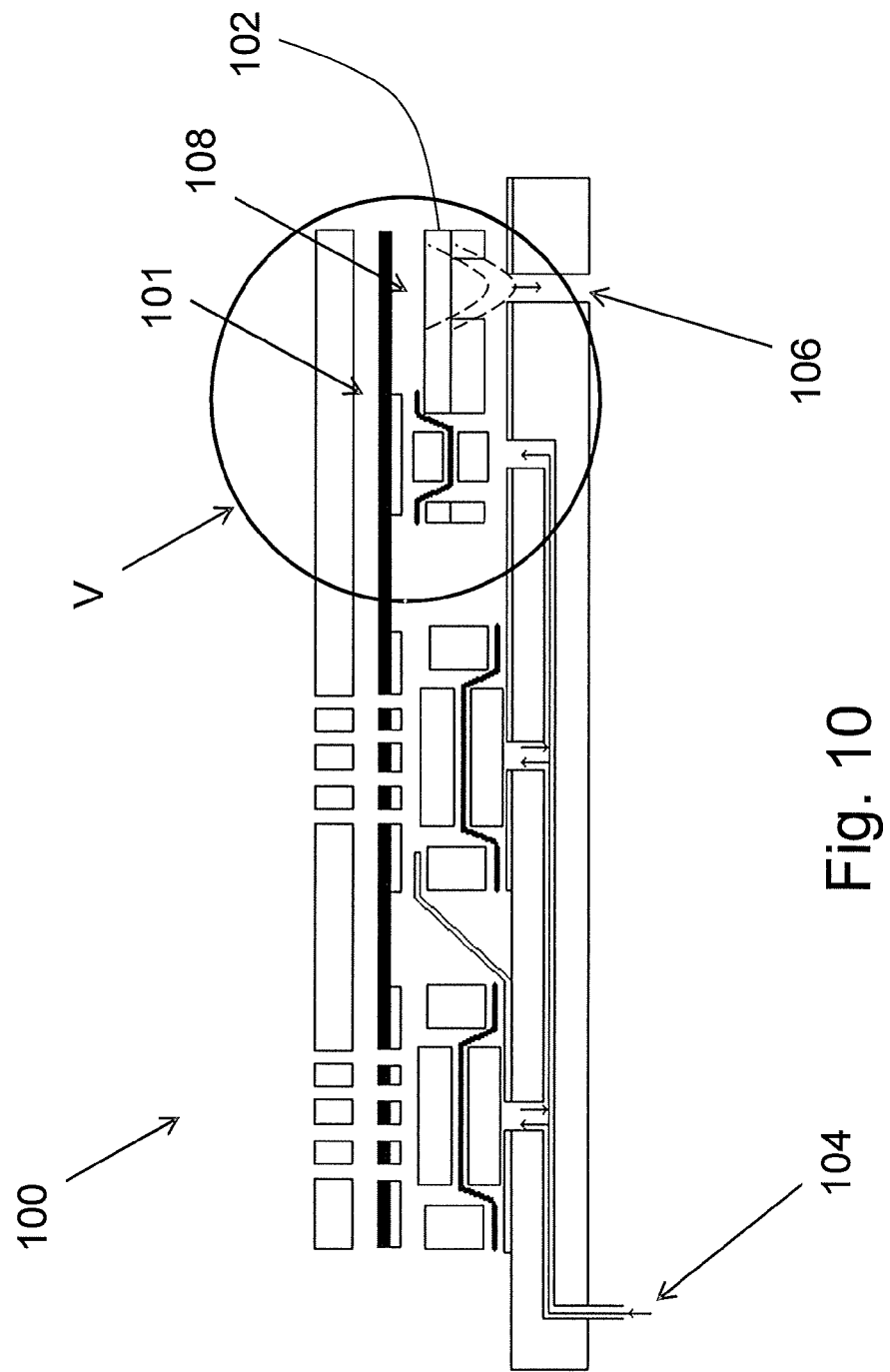

FIG. 7 schematically illustrates a hydrogen pump usable in an actuator;

FIG. 8a schematically illustrates a valve mechanism incorporating an actuator comprising a hydrogen pump according to FIG. 7 and with screw holes for clamping; FIG. 8b shows the components of a valve mechanism in an exploded view;

FIG. 9 shows a further embodiment of the valve mechanism;

FIG. 10 shows the valve mechanism integrated in a fuel cell assembly; and

Figure 11:
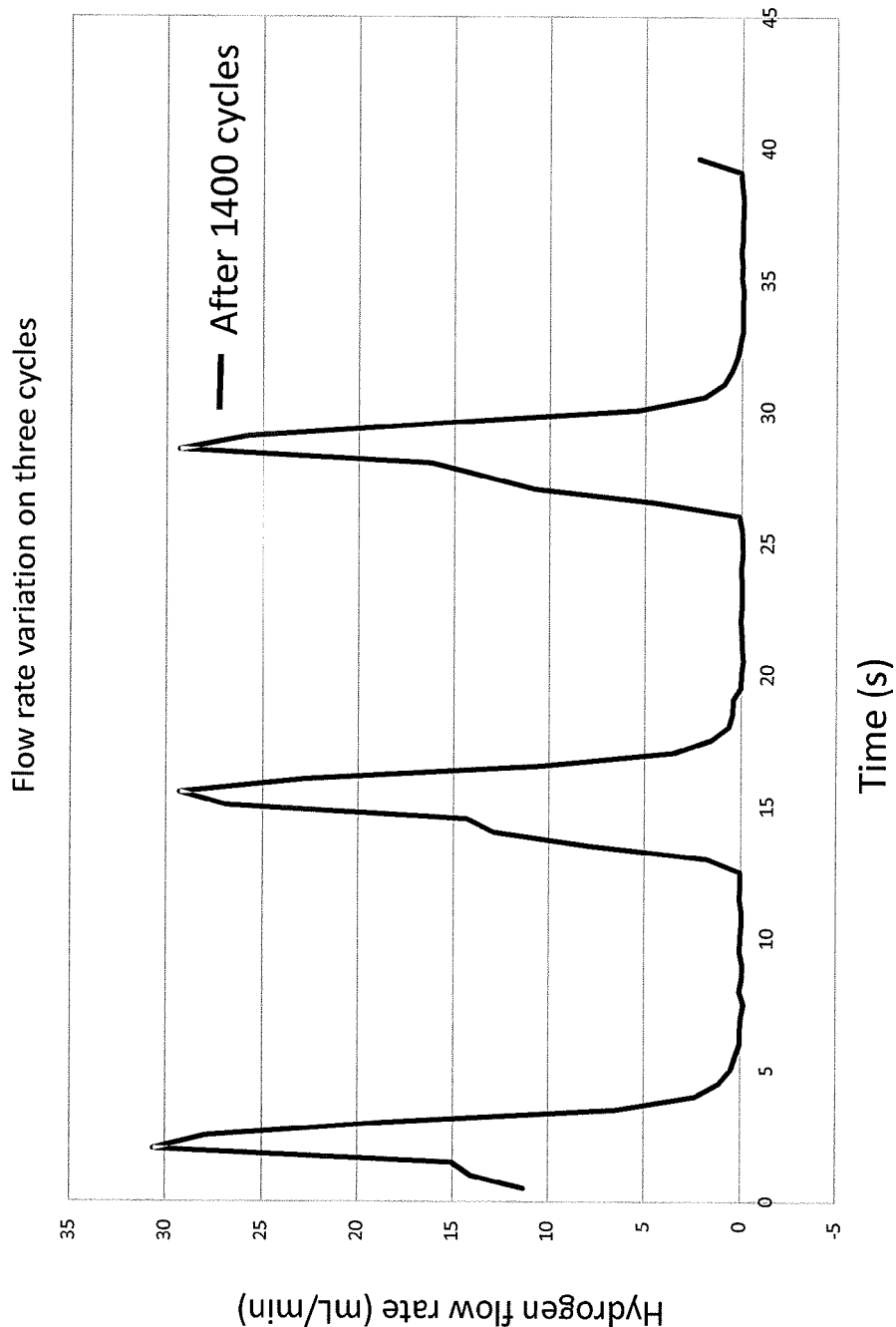

FIG. 11 is a graph illustrating behaviour after a life-time test.

DETAILED DESCRIPTION OF PREFERRED EMBODIMENTS

For the purpose of this application the term "valve mechanism" shall be taken to mean the mechanical/electrochemical design that seals a valve and that can be opened or closed by an actuator movement.

In its most general aspect the present invention comprises an electrochemically operable actuator. The actuator comprises a support structure, a flexible membrane sealed against said support structure to form a compartment, electrochemical means adapted to generate hydrogen or oxygen gas and to deliver the gas to the inside of said compartment. The electrochemical means comprises an ion conducting membrane having an electrode on opposing sides thereof, and terminal means for connecting a voltage source to enable applying a potential across the electrodes. The flexible membrane is preferably a separate entity. The electrochemical means is preferably integrated with the flexible membrane. In preferred embodiments the electrochemical means is a hydrogen pump, but it can also be an electrolyser. The electrochemical means can also be operated as both a hydrogen pump and an electrolyser. Suitably the membrane is made of silicone rubber or other non-electrochemical but inert foil, but in some embodiments it is an electrically conductive membrane forming part of a membrane electrode assembly. Preferably the electrochemical means is at least partially embedded in the membrane.

Figure 1:
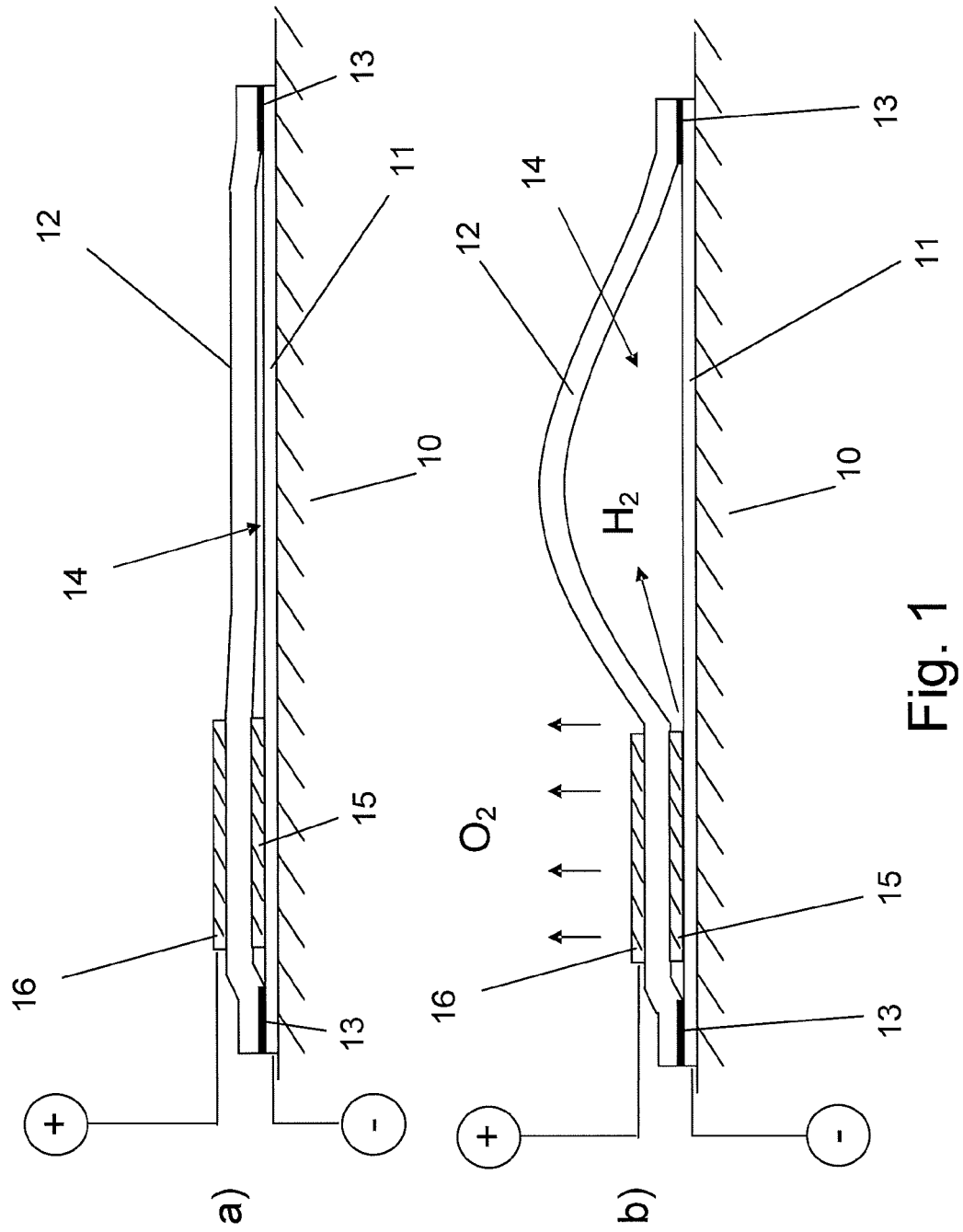
FIG. 1b shows schematically the actuator according to the invention in an actuated state.

In FIGS. 1a and b the one embodiment of an actuator and its working principle are shown schematically.

FIG. 1a is thus a schematic illustration of an embodiment of an actuator and shows the inventive concept. The actuator comprises a preferably rigid support 10. On the support 10 there is provided an electrical contact, suitably in the form of a Sn coated copper foil 11. An ion conductive polymer membrane 12 is attached onto the support 10 in contact with the foil 11, suitably by means of an adhesive 13 (suitably double-sided) which can be applied as a frame extending along the periphery of the support, onto which the membrane 12 is positioned and thus attached. In this way a sealed compartment 14 is formed between the membrane 12 and the support 10 with its foil coating 11.

On at least a part of the membrane 12 there is provided electrodes 15, 16 on opposite sides of the membrane. In the figure there is a cathode 15 on the side of the membrane 12 facing the support 10, and an anode 16 on the opposite side of the membrane.

The electrodes 15 and 16, respectively, are coupled by some suitable contact means (not shown) to an electrical power source supplying appropriate voltage and current (indicated by the encircled "+" and "−").

The support 10 should be substantially more rigid than the membrane 12 as the deflection of the membrane must not affect the planarity of the support to any significant degree.

FIG. 1a shows the actuator in a non-energized state.

FIG. 1b shows a situation wherein a voltage has been applied across the membrane 12 via the electrodes 15 and 16, respectively.

The membrane 12 is preferably hygroscopic such that it will absorb moisture from the ambient atmosphere. Examples of membrane materials are sulfonated polyaromates, perfluorocarbon-sulfonic acid ionomers, sulfonated polyolefines, sulfonated polysulfones. Thus, applying a suitable voltage of typically 1.5-4 V will initiate an electrolysis of the water within the membrane. Thereby $H_2$ will evolve at the cathode and $O_2$ will evolve at the anode. Since the cathode is confined in the sealed compartment formed between the membrane 12 and the support 10, the hydrogen cannot escape to the surrounding but will start to build up a pressure inside said compartment 14.

Figure 2:
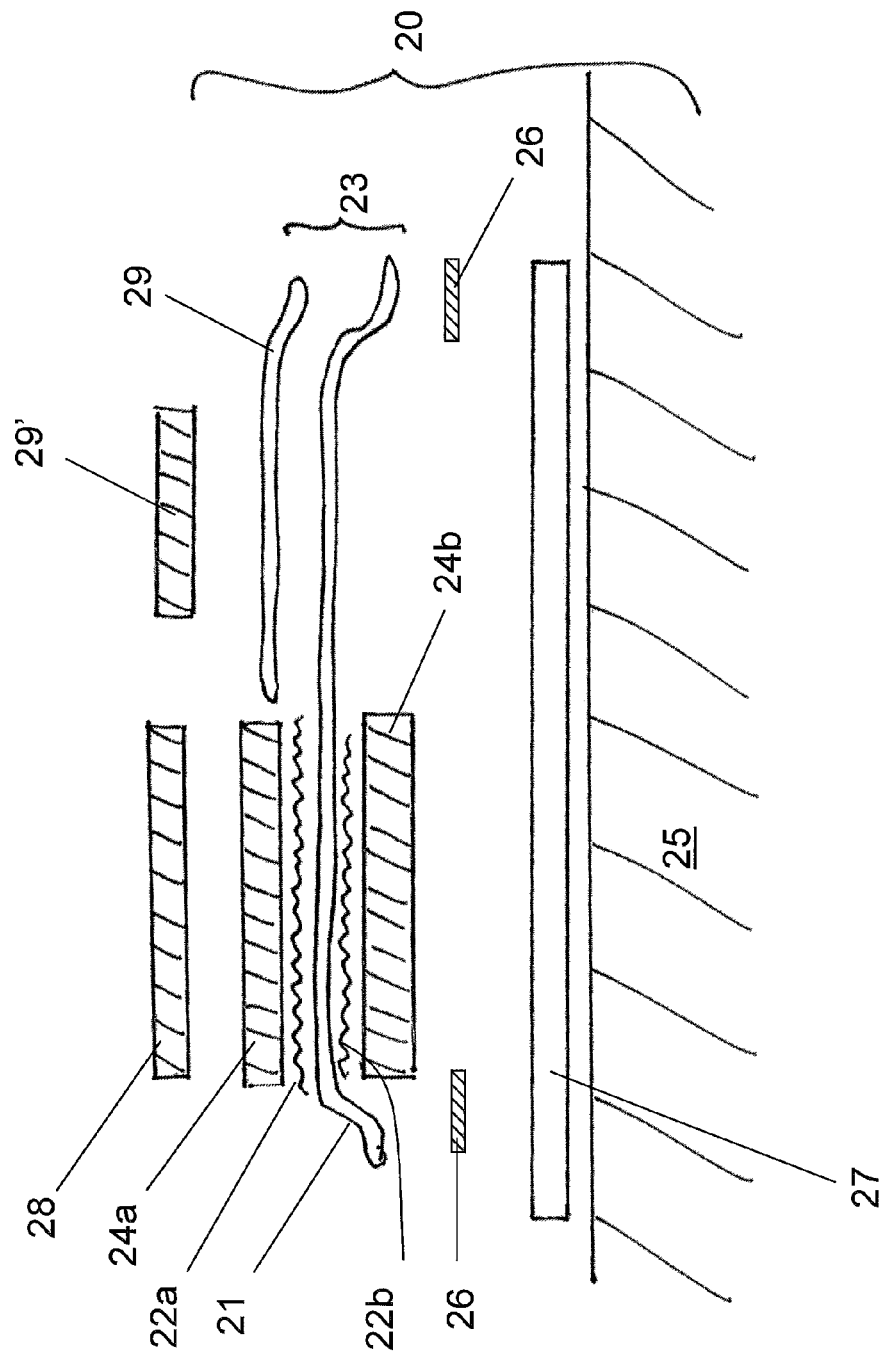
FIG. 2 is a cross-section of an embodiment of the actuator shown in more detail.

In FIG. 2 an embodiment of the actuator is shown in more detail.

The basic and most vital component of this actuator generally designated with reference numeral 20 is an ion conducting polymer membrane 21 e.g. a proton conducting ionomer such as Nafion which is coated with thin electrodes, an anode 22a and a cathode 22b, and also, if needed, partially covered with gas diffusion layer materials 24a, 24b (GDLs) on both sides. The membrane can also be anion conducting, e.g. hydroxide ion conducting. The electrode/catalyst coated membrane is referred to as a 3-layer membrane electrode assembly (MEA; also referred to as a catalyst-coated membrane, CCM) 23.

The catalyst for the $O_2$ electrode can e.g. be Pt/Ru on a carbon support. It should preferably be composed of a robust catalyst and carbon support, such as those used in polymer electrolyte membrane electrolysers. For the $H_2$ electrode the catalyst can be Pt on carbon, but with a lower loading, e.g. 0.05-0.5 mg Pt/cm$^2$, than on the $O_2$ side, which would have 0.5-1 mg Pt/cm$^2$.

The electrodes 22a, 22b must not extend over the entire membrane area. The membrane can also be a Nafion membrane sandwiched between catalyst coated GDLs i.e. a combination of GDL 24 and active electrode layer 22. One side of the membrane 21 is sealed against a mechanically rigid surface 25, preferably obtained by attaching a frame of double sided adhesive 26 between the membrane and the rigid surface. The electrodes are in electrical contact with an outer electric circuit providing current and voltage. The electrical contact on the sealed side of the CCM can preferably be a Sn-coated copper foil 27 in contact with the GDL 24b on the sealed side. On the outside the current collection can be made of a metallic clamping means 28 which is positioned to clamp the GDLs. Said clamping can also be perforated with holes to improve gas transport to the electrodes. Alternatively the outside current collection can be made by a current collector foil e.g. a flexible foil PCB, printed circuit board positioned between the clamping means 28 and the outer GDL 24a. Said flexible foil PCB, essentially a thin flexible PCB, can also be used for other contacts and sensors in the valve assembly. Optionally, to support the membrane 21 a thin supportive plastic film 29 can be attached by adhesive means and cover a part of the membrane.

In order to increase the force and longevity of the actuation membrane, a rigid washer 29' can be attached to it. The washer/rigid planar surface can also be positioned so as to come in contact with the object for actuation, such as a valve stem. The larger the area of the washer that is in contact with the membrane the larger the actuation force will be, and simultaneously the actuation stroke is reduced in magnitude.

Now the actuation process will be described in detail.

In one embodiment the actuation is arrived at by an electrolysis process. Thus, by applying a voltage of typically 1.5-4 V between the electrodes, oxygen and hydrogen will evolve. Said gases are emanating from the electrolysis of water molecules in the hygroscopic ionomer membrane and in the electrodes. The electrodes can be polarized so that hydrogen is evolved on the sealed side of the membrane or alternatively polarized so that oxygen is evolved on the sealed side. The gas evolved inside the compartment 14 will cause the membrane 12 to "bulge" upwards (see FIGS. 1a and 1b), and the force provided during this stroke is sufficient to mechanically push on some movable element such as a valve stem.

In the case when oxygen is evolved on the sealed side and hydrogen is present on the outside, then re-actuation (i.e. decrease in height of the membrane) can be obtained by decreasing the voltage between the electrodes to 0-0.9 V. Thus, in this mode the oxygen and hydrogen is consumed in the same way as in a fuel cell. Alternatively re-actuation can be obtained by having a small leakage from the sealed side. Due to the leakage, the membrane is lowered when the current producing oxygen on the sealed side is turned off.

The actuation can also be arrived at by hydrogen pumping. In this case, if hydrogen is present on the outside of the membrane, actuation can be obtained by polarizing the MEA/CCM to between 0-1.2 V, preferably 0.05-0.3 V, which is less than that required for electrolysis. The sealed side of the MEA/CCM should be connected to the negative side of the power source. During hydrogen "pumping" the electrode reaction on the positive side is electrochemical oxidation of $H_2$ to $H^+$, the protons then migrate and diffuse across to the negative side of the membrane where they are electrochemically reduced to $H_2$ gas again. The MEA/CCM is lifted from the sealed surface by electrochemical "pumping" of hydrogen into the sealed side of the MEA/CCM. Re-actuation (decrease of the membrane height from the sealed surface) is obtained by reversing the polarization, which results in hydrogen being pumped out from the sealed side. Alternatively re-actuation can be obtained by having a small leakage from the sealed side. Due to the leakage, the membrane is lowered when the current producing hydrogen on the sealed side is turned off.

Now the invention will be exemplified with reference to an implementation together with a valve, in particular a purge valve, although the invention is of course applicable to all kinds of valves. Furthermore, the invention could be implemented with numerous other kinds of devices requiring actuation.

A purge valve is normally required in operation of fuel cells working in so called dead-end mode. During operation there is a build-up of inert gases, such as $N_2$, $H_2 0(g)$, near the outlet, which must be purged out occasionally. Two different purge valves are shown in FIGS. 3a-b and 4a-b. The details relating to the actuator as such are given the same reference numerals as in FIG. 1.

A valve, generally indicated at 30, of this type could for example be positioned between two steel plates 31, 32 which together with a plastic frame 33 form a sealed cavity 34. In the bottom portion of the shown assembly there will be gas channels 35 for passing hydrogen into the cavity 34. Hydrogen is fed into the cavity via an opening 36 from the gas channel 35. It should be understood that the actuators and valve designs described below can also be used for other types of valve, e.g. an inlet valve. The examples described below can for example be applied in the passive type fuel cell assemblies described in the patent publications mentioned in the background, but the actuator can be applied also with conventional stack fuel cells.

A purge valve that is open in a non-actuated state is shown in FIG. 3.

The valve mechanism 30 is mounted to an upper (as seen in the figure) steel plate 31 in a hole 31' extending through the plate. The valve comprises a valve stem 37 connected at one end to a valve head 37' and to a stop member 37" at the other end. The stop member will restrict the stroke of the valve. There is also provided an O-ring 38 arranged around the valve stem 37 and resting on the valve head 37', said O-ring providing the sealing function between the valve head 37' and the lower side of the steel plate 31. There is also provided a spring 39 around the valve stem 37, which will force the valve to an open position (i.e. downwards in the drawing).

In this design the valve is normally open and it is only closed when the valve 30 is actuated, i.e. when the membrane 12 is lifted from the surface on the sealed side 14 and thereby pushes the spring-loaded valve head 37' upwards (as seen in the figure). During operation of the fuel cell, the valve is maintained in its closed state by a small support current (this current could also be intermittent). In order to monitor the position of the valve, and the pressure on the sealed side (e.g. to avoid too high pressure), there may be a pressure sensitive contact (not shown) between the CCM/membrane 12 and the flat surface of the valve mechanism. If the applied current is small enough there will be an equilibrium pressure due to 1) leakage of hydrogen through the seal, 2) back diffusion of hydrogen through the membrane, 3) the thermodynamic equilibrium pressure determined by the voltage difference over the membrane/CCM.

The valve will be opened occasionally by reversing the potential and the current, thereby "pumping" hydrogen back through the membrane.

Figure 4:
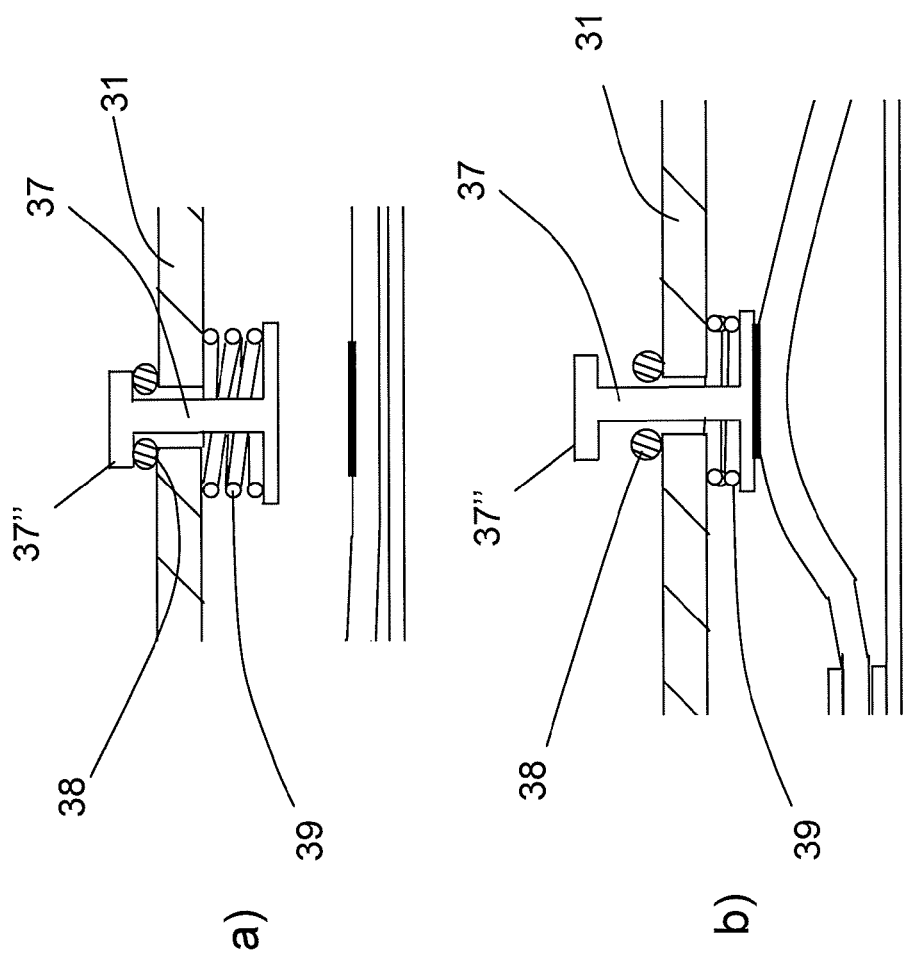

A purge valve that is closed in a non-actuated state is shown in FIG. 4.

This valve mechanism comprises essentially the same components as the valve in FIG. 3. However, in this configuration the O-ring 38 is provided on the upper side (as seen in the figure) of the steel plate, between the surface of the plate 31 and the stop member 37".

Thus, there is a valve stem 37 and an O-ring 38 and a spring 39 which will force the valve to closed position (i.e. down in the drawing), as shown in FIG. 4a.

This valve is thus normally closed and therefore an alternative opening mechanism (e.g. a manual mechanism), should be provided to enable purging of the fuel cell assembly during startup (i.e. before hydrogen has reached the purging valve at the outlet). Alternatively, before hydrogen has reached the outlet, the valve can be opened by increasing the voltage so that hydrogen and oxygen is evolved (preferably hydrogen on the sealed side).

While running this dead-end fuel cell assembly, purging is obtained by polarizing the electrodes and thereby opening the valve, preferably by pumping hydrogen into the sealed side. Closing of the valve is obtained in a similar way as before by reversing the voltage and the current.

The invention will now be further illustrated by way of a non-limiting example.

EXAMPLE 1

Reduction of a Release Pressure from an Umbrella Valve

In order to examine the actuator concept according to the present invention a test setup is built.

The actuator for the test set does not contain any GDLs. An exploded schematic illustration of the test setup 50 is shown in FIG. 5a and an overall experimental setup is shown in FIG. 5b.

51 is the outlet endplate to which a plastic gas nipple is connected (about 25×25×1 mm), 52 and 53 are silicone rubber seals (total thickness about 4 mm) with center hole to allow for the umbrella valve head to move, 54 is the umbrella valve (Vernay, VA3497, silicone), 55 is a plate of about 2 mm thickness with a 3.6 mm hole for mounting the umbrella valve, 56 is a silicone seal with a large opening (about 7 m) and a slit to provide gas lead, 57 is a rigid washer (not in scale) which has a smaller diameter (about 6 mm) than the large opening of the silicone seal 56. The thickness of the silicone seal 56 is about 2 mm and the washer 57 is about 1 mm thick. 58 is a Sn coated Cu foil for current collection inner diameter of about 8 mm, 59 is a MEA of diameter 12, 60 is an insulating tape with a center hole of 11 mm and a gas lead hole of 2 mm below, 61 is a second current collector tape, 62 is a backing plate made in plastic with hole for gas leads, 63 is a silicone rubber seal with a center hole and a slit to provide gas lead, 64 is the inlet endplate to which a plastic gas nipple is connected. The assembly is clamped together with M3 screws and nuts.

The setup, schematically shown in FIG. 5b, is connected to a hydrogen source 65 with a pressure of about 1.8 PSI and a rotameter with a needle valve 66 (flow restrictor (needle valve) that is set to a maximum of about 45 ml/min). The pressure of the system is registered with an electronic pressure gauge 67.

When the actuator pushes on the umbrella valve its release pressure is decreased, which consequently gives a higher flow through the setup and a lower pressure is registered.

Test procedure: A pressure vs time curve for a test procedure is shown in FIG. 6.

The power supply unit, PSU (TTI CPX 200) is set to a max current of 50 mA and a max voltage of about 4 V. The PSU is turned on after 10 seconds. When the pressure is decreased to 0 PSI (after about 70 seconds), the PSU is turned off. This leads to a decrease in the actuator force that pushes on the back side of the umbrella valve, and thus to an increased pressure of the system. After about 150 seconds the PSU is turned on again and the pressure decreases again. The membrane material in the actuator was slightly humidified before the experiment.

The reason for not receiving a pressure response directly after turning on the PSU is that the pressure inside the sealed cavity needs to build up before it will affect the umbrella valve release pressure. The reason for the higher minimum pressure obtained the second time can be that the umbrella valve has been positioned in a different way and therefore it provides a higher release pressure.

In another experiment the voltage of the PSU is reversed and set to 0.7 V. In this case the actuator principle used is that of a hydrogen pump. This provided, in principle, a similar curve as the one shown in FIG. 6.

Now a preferred embodiment of an actuator/valve mechanism utilizing the hydrogen pumping aspect of the present invention will be described.

The hydrogen pump is the core of this aspect of the valve system according to the invention.

In general, an actuator is something that converts energy into motion. It can also be used to apply a force. An actuator typically is a mechanical device that takes energy, usually created by air, electricity, or liquid, and converts that into some kind of motion. That motion can be anything from blocking to clamping to ejecting. Actuators are typically used in manufacturing or industrial applications and may be used in things like motors, pumps, switches, and valves.

For the purpose of this application an actuator is taken to be the electrochemical hydrogen pump together with a gas chamber in which an overpressure can be generated. One wall of the chamber is constituted by a flexible membrane, and the pressure increase inside the chamber will cause the flexible membrane to move (bulge) and either affect a valve member by pushing it into a valve seat, or the membrane itself can perform a sealing action.

FIG. 7 is a schematic illustration showing the main components of the hydrogen pump part of an actuator based on the principle of hydrogen pumping.

Thus, the hydrogen pump comprises a MEA 70 having one GDL 72 provided on each side. In an exemplary embodiment the MEA comprises a membrane made of Gore® PRIMEA MEA cleo series 5710, with a thickness of 18 μm. It has a catalyst loading of 0.4 mg/cm$^2$ of platinum on each electrode. The GDLs 72 are suitably made of a porous material such as, but not limited to, a roughly 200 μm thick carbon-fiber paper, based on expanded natural graphite. Such material can be obtained from SGL GROUP-SIGRACET.

The assembly of MEA/GDLs are attached to a (bottom) current collector 74 by means of a conductive adhesive 76. The purpose of the conductive adhesive is to seal and avoid any hydrogen leak between the MEA and the bottom current collector. On top of the assembly a current collector 78 is also provided and held in place by clamping the entire assembly. Clamping also reduces the contact resistance. The current collectors are conventionally made of metal foil suitably copper. In the top current collectors there is provided holes) for enabling access of e.g. hydrogen gas to the MEA. In the bottom current collector and the adhesive there are also provided holes for enabling evolved gas to exit and enter into a gas chamber.

One of or both of the current collectors could be made of a flexfoil with gold plated contacts, which would make it easier to integrate the hydrogen pump in a fuel cell assembly as described in other patents.

The hydrogen pump will be shown schematically only in the following drawings, and will be represented by only a contour shape.

In FIG. 8a a set-up is shown in which the above described hydrogen pump is utilized in an actuator for a valve. In this embodiment the valve is open in its "normal" state, i.e. the actuator is operated only to close the valve. Other configurations are possible where the valve is normally closed and the actuator is consequently used to open the valve.

Thus, in FIG. 8a there is shown an electro-chemical valve mechanism according to the invention comprising an actuator based on a hydrogen pump, an embodiment of which is shown in FIG. 7.

The actuator is integrated in the valve mechanism and forms an integral part thereof. In FIG. 8a the hydrogen pump 83 is shown without details showing as a unit. The entire mechanism is provided between two steel plates 81, 811 each suitably about 0.5 mm thick. The structure is built up by layers of material sheets, and from bottom and up (as seen in FIG. 8a, and even more clearly in the exploded view in FIG. 8b) there is provided a first steel plate 81 on which there is provided a thin sheet of a non-conductive polymer material 82, such as polyethylene or polycarbonate, about 0.4 mm thick, and in which there is made at least one recess 86 that forms a channel in the completed structure. The recess is about 1.5 mm wide and 13 mm long.

On the non-conductive layer 82 there is provided a thin sheet 84, about 0.2 mm thick, of another non-conductive polymer material, such as polyethylene or polycarbonate. In this sheet there are provided holes 84', 84" respectively, that will enable the introduction of gas into the channel formed by recess 86, and to enable exit of gas from the channel 86.

The hydrogen pump 83 is placed in contact with sheet 84 such that the cathode side of the cell is located over the inlet hole 84'.

The hydrogen pump 83 is "embedded" in layers 85 (adhesive) and 87 (silicone rubber membrane), respectively. This is achieved by forming openings in the respective material layers such that they can accommodate the actuator unit 83. In this way the hydrogen pump top surface will be flush with the membrane, i.e. it will not extend above the surface of the membrane. The adhesive 85 has an opening 85' covering the outlet 84" from the channel/recess 86 and having an extension such as to form a chamber. The silicone rubber layer 87 which is attached to the non-conductive layer 84 by the adhesive 85 will therefore be movable in the region where the opening in the adhesive is located.

On the silicone rubber layer 87 there is a further sheet 813 of a non-conductive polymer material e.g. polyethylene or polycarbonate, about 0.2 mm thick. This sheet has an opening 813' to expose the anode side of the actuator unit 83, and an opening 813" located over the chamber formed by the opening 85' in the adhesive 85, beneath the silicone layer. Thus, the combination of the openings in the respective layers 84 and 813 enables the silicone rubber to flex in response to pressure forces in the chambers on either side.

A still further non-conductive layer 88 is provided on top of the layer 813. This layer 88 has a recess 88' that extends between and overlaps the openings in layer 813 so as to form a communication channel 810 there between. In layer 88 there are also provided holes forming an inlet 812 to the hydrogen pump 83 upper side as seen in the figure (for hydrogen access) and an outlet 89 from the chamber formed by the opening 813" in layer 813. Finally, on top there is a second steel plate 811, having holes corresponding to the holes in layer 88 for the inlet/outlet 812/89, respectively.

Thus, as can be seen in the figure there is an open communication channel between the inlet 812 and the outlet 89 through the shown assembly. In operation of a fuel cell this assembly connects the hydrogen fuel tank with the active cells in the fuel cell stack. However, if it is required to close the fuel supply to the fuel cell stack, the hydrogen pump 83 is operated, and by pumping hydrogen through the hydrogen pump the pressure beneath the silicone membrane will start building up and cause the silicone membrane to bulge "upwards" (as is schematically illustrated with a broken line in the figure) and eventually seal the outlet 89.

When it is desired to open the valve again, the actuator is run "backwards" by reversing the polarity such that hydrogen present in the channel 86 will be consumed at the electrode and reformed at the other side of the actuator.

Another embodiment is illustrated schematically in FIG. 9. Reference numerals for same or similar features as in FIG. 8 will be the same but beginning with a "9". Thus, one way to improve the sealing of the outlet 99 when the silicon rubber membrane 97 is pushed up, and closing the valve, could be to use a "hat" 915. The hat could consist of a small piece 915 of a quite soft material, for instance silicon rubber, not so much larger than the outlet hole. This one should be glued on a larger piece made of a stiff material 914 which is glued on the silicon rubber membrane 97. Thus when the hydrogen pump 93 is pumping, the pressure applied by the silicon rubber membrane 97 will be focused only on a small area around the outlet hole, improving the sealing. The use of a hat could both save energy and save expensive material such as platinum. Indeed, as the pressure is focused on a small area, the actuator side does not need to reach a high pressure. For instance if a pressure of about 1 bar is required to seal the outlet without this hat, in theory much less pressure is required when there is provided a hat. Indeed if a hat of 3 mm of diameter is glued on a stiff material piece having a diameter of 6 mm, a pressure of 0.25 bar is quite enough for sealing. In an embodiment employing a hat the current supplied to close the valve could be lowered, allowing a smaller hydrogen pump to be used.

In FIG. 10 an implementation of the valve according to the invention in a fuel cell assembly 100 is schematically illustrated. The fuel cells in this embodiment are in-plane polymer electrolyte fuel cells, preferably series connected and arranged in one plane. The assembly is built up from a plurality of layers of materials having the desired and required functionalities. The valve mechanism is embedded in at least one of the layers making up the assembly. The valve V comprising the hydrogen pump 101 and the silicone membrane 102 are shown encircled.

In operation of a fuel cell assembly hydrogen gas is supplied to the assembly as seen by the arrows, the inlet at 104 and the outlet at 106. If it is desired to close the outlet 106 the hydrogen pump 101 is energized and it starts pumping hydrogen into the compartment 108, whereby the pressure increases and the membrane 102 begins to bulge as indicated by the broken lines whereby it closes the outlet 106.

For testing the valve a life-time experiment was performed, and is described in Example 2 below.

EXAMPLE 2

A valve was designed according to FIG. 8*a*. The steel plates on top and bottom was 0.5 mm thick. The clamping was achieved with six M2 screws and nuts. The outer dimensions of the whole assembly (not including the screws and nuts) was 25×15×4 mm. The sealing properties between the silicone rubber membrane and the outlet hole were improved by adding a little silicone grease.

The cycling functionality of the valve was examined by connecting the inlet to hydrogen gas of 1 bar and the outlet to a mass flow controller (set to 50 ml per minute). Through the electrical contacts the valve was exposed to the following cycle: +100 mA for about 2 seconds (closing the valve), open circuit for about 1 second, +10 mV for about 3 seconds (maintaining the valve closed), open circuit for about 1 second, −100 mA for about 2 seconds (opening the valve again), open circuit for 3 seconds. This cycle was repeated for 1500 cycles and the flow profile through the mass flow regulator was registered. The flow profile was similar throughout the 1500 cycles and cycles around 1400 is given in FIG. 11. The valve is opening and closing nicely and the inflection point of the flow seen in the opening of the valve is due to the flow regulation inside the mass flow controller. The energy consumption of one cycle was about 70 mJ and the maximum power needed was about 10 mW. After leaving the valve on the shelf for 20 days the experiment was repeated for 1000 cycles with essentially the same gas flow results.

The invention claimed is:

1. A valve mechanism, comprising:
   a layered structure comprised of layers of material;
   a communication channel (810) located within the layered structure, the communication channel having an inlet and an outlet;
   an electrochemically operable actuator, comprising
   a support structure (81, 82, 84, 85),
   a flexible membrane (87) sealed against said support structure to form a compartment,
   electrochemical means (83) that i) generates a gas comprising of one of hydrogen and oxygen gas and ii) delivers the generated gas to an inside of said compartment such that a gas pressure is provide within said compartment,
   the electrochemical means comprising an ion conducting membrane having an electrode on opposing sides thereof, and terminal means for connecting a voltage source to apply a potential across the electrodes; and
   a channel (86) provided in at least one layer of the support structure and in fluid communication with one side of the electrochemically operable actuator for receiving the generated gas evolving from the electrochemically operable actuator during operation,
   wherein said flexible membrane forms at least part of one of the layers of the support structure, and
   wherein the membrane in operation seals the outlet of said communication channel to form said compartment as a closed compartment and the gas pressure being exerted on the membrane bulging the membrane to form the closed compartment.

2. The valve mechanism according to claim 1, wherein the flexible membrane is a separate entity.

3. The valve mechanism according to claim 1, wherein electrochemical means is integrated with the flexible membrane.

4. The valve mechanism according to claim 1, wherein the electrochemical means is a hydrogen pump.

5. The valve mechanism according to claim 1, wherein the electrochemical means is an electrolyser.

6. The valve mechanism according to claim 1, wherein the electrochemical means is operable as both a hydrogen pump and an electrolyser.

7. The valve mechanism according to claim 1, wherein the flexible membrane is made of silicone rubber or another nonelectrochemical but inert foil.

8. The valve mechanism according to claim 7, wherein the electrochemical means is at least partially embedded in the flexible membrane.

9. The valve mechanism according to claim 1, wherein the electrochemical means comprises a membrane electrode assembly (MEA), and a gas diffusion layer (GDL) on each side of the membrane electrode assembly (MEA), and a current collector on each side of thereof.

10. The valve mechanism according to claim 1, wherein the support (10) is substantially more rigid than the membrane (12) in order that deflection of the membrane must not affect the planarity of the support (10) to any significant degree.

11. The valve mechanism according to claim 1, wherein there is a rigid member (19) attached to the flexible membrane, and positioned so as to come in contact with an object to be actuated.

12. The valve mechanism according to claim 1, wherein the flexible membrane is attached by an adhesive to one layer in the support structure, but leaving an area of the membrane unattached to the one layer so as to form a compartment between said one layer and the membrane.

13. The valve mechanism according to claim 1, a hole being provided in said one layer that provides fluid communication between the compartment and the channel.

14. The valve mechanism according to claim 1, wherein the membrane is provided in proximity to a gas channel opening such that the membrane closes the opening when the actuator in operation.

15. The valve mechanism according to claim 1, wherein, the support structure is comprised of a build-up of layers of material (81, 82, 84, 85), from a bottom and up comprising i) a first plate (81),
ii) a first sheet (82) of a non-conductive polymer material provided on the first plate (81), the sheet of the non-conductive polymer material (82) includes a recess that forms the channel (86) in fluid communication with one side of the actuator for receiving the generated gas evolving from the actuator during operation,
iii) a second sheet (84), thinner than said first sheet, provided on the first sheet, the second sheet being a non-conductive polymer material, the second sheet comprising holes (84', 84") providing a fluid communication path of the generated gas into the channel (86) and exiting the channel (86), and
iv) an adhesive layer (85) provided on the second sheet, the flexible membrane (87) is provided on the adhesive layer (85), and
the electrochemical means (83) is an actuator unit embedded in the adhesive layer (85) and the flexible membrane (87).

16. The valve mechanism according to claim 15, wherein the sheet of the non-conductive polymer material (82) is comprised of one of polyethylene and polycarbonate.

17. The valve mechanism according to claim 15, wherein,
the first sheet of the non-conductive polymer material (82) is comprised of one of polyethylene and polycarbonate and is about 0.4 mm thick, and
the recess is about 1.5 mm wide and 13 mm long,
the second sheet is about 0.2 mm thick and is one of a polyethylene sheet and a polycarbonate sheet.

18. The valve mechanism according to claim 15,
wherein the flexible membrane (87) is a silicone rubber layer, and
further comprising:
a non-conductive layer (813) having a thickness less than a thickness of the first sheet (82) and openings, and
a further non-conductive layer (88) provided on a top of the non-conductive layer (813), the further non-conductive layer (88) having openings on each side of a recess that extends between and overlaps the openings in the non-conductive layer (813) forming the communication channel (810) there between.

19. The valve mechanism according to claim 18, further comprising:
a second plate (811) on the further non-conductive layer (88), the second plate having openings aligned with the openings in the further non-conductive layer (88).

* * * * *